'59-333 SR
5/2/87 OR RE 32,431

United States Patent [19]

Dakin et al.

[11] E Patent Number: Re. 32,431

[45] Reissued Date of Patent: Jun. 2, 1987

[54] SYSTEM FOR ROTATING AN INFORMATION STORAGE DISC AT A VARIABLE ANGULAR VELOCITY TO RECOVER INFORMATION THEREFROM AT A PRESCRIBED CONSTANT RATE

[75] Inventors: Wayne R. Dakin, Redondo Beach; Ludwig Ceshkovsky, Fountain Valley, both of Calif.

[73] Assignee: Discovision Associates, Costa Mesa, Calif.

[21] Appl. No.: 732,033

[22] Filed: May 8, 1985

Related U.S. Patent Documents

Reissue of:

[64] Patent No.: 4,223,349
Issued: Sep. 16, 1980
Appl. No.: 961,404
Filed: Nov. 16, 1978

[51] Int. Cl.[4] ..... H04N 5/785

[52] U.S. Cl. ..... 358/338; 358/342; 369/50; 369/111

[58] Field of Search ..... 358/322, 323, 338, 339, 358/342; 369/44, 45, 46, 47, 48, 50, 56, 111, 43; 360/73

[56] References Cited

U.S. PATENT DOCUMENTS

| | | | |
|---|---|---|---|
| 2,113,226 | 4/1938 | Young . | |
| 2,901,737 | 8/1959 | Stovall, Jr. | 360/73 |
| 3,646,259 | 2/1972 | Schuller | 360/73 |
| 3,662,353 | 5/1972 | Chertok . | |
| 3,753,067 | 8/1973 | Milligan | 318/314 |
| 3,826,965 | 7/1974 | Bringol | 318/39 |
| 3,925,606 | 12/1975 | Wood et al. . | |
| 3,939,302 | 2/1976 | Kihara . | |
| 4,123,779 | 10/1978 | Goldschmidt | 358/338 |
| 4,236,050 | 11/1980 | Winslow et al. | 369/47 |

FOREIGN PATENT DOCUMENTS

| | | |
|---|---|---|
| 2257817 | 5/1974 | Fed. Rep. of Germany . |
| 49-16409 | 2/1974 | Japan . |
| 52-40308 | 3/1977 | Japan . |
| 1550915 | 8/1979 | United Kingdom . |
| 1602893 | 11/1981 | United Kingdom . |

*Primary Examiner*—Donald McElheny, Jr.
*Attorney, Agent, or Firm*—Ronald J. Clark

[57] ABSTRACT

Method and apparatus for recovering information at a substantially constant rate from a rotatable information storage disc. The information is stored on the disc in a plurality of substantially circular and concentrically arranged information tracks, with a substantially uniform recording density, and it is recovered by controllably rotating the disc, relative to a transducer, at an angular velocity substantially inversely proportional to the radius of the corresponding track. The apparatus includes a coarse speed control potentiometer for producing a measure of the radius of the particular information track from which information is being recovered, and fine speed control means for comparing the relative phase angles of a periodic signal in the recovered information and a periodic reference signal and for producing a fine speed control signal proportional to the phase difference. The measure of radius and the fine speed control signal are summed together and coupled to a voltage-controlled oscillator to produce a composite speed control signal, which is coupled to a servo to rotate the disc at a corresponding angular velocity.

19 Claims, 6 Drawing Figures

SYSTEM FOR ROTATING AN INFORMATION STORAGE DISC AT A VARIABLE ANGULAR VELOCITY TO RECOVER INFORMATION THEREFROM AT A PRESCRIBED CONSTANT RATE

Matter enclosed in heavy brackets [ ] appears in the original patent but forms no part of this reissue specification; matter printed in italics indicates the additions made by reissue.

BACKGROUND OF THE INVENTION

The present invention relates generally to systems for recovering information from a record medium, and, more particularly, to systems for recovering information from an information storage disc that is rotatable at a variable angular velocity.

Information storage discs having a plurality of substantially circular and concentrically arranged information tracks are becoming increasingly popular, particularly when used for storing video signals. Each information track on the disc typically stores one complete frame of the video signal, so recovery of the video signal at a prescribed constant rate necessary for proper reception of the signal by a conventional television receiver ordinarily necessitates a rotation of the disc relative to a transducer at a substantially constant angular velocity.

An example of a servo apparatus for recovering a video signal from such a disc is described in a co-pending and commonly assigned application for U.S. patent Ser. No. 890,670, filed in the name of W. R. Dakin et al and entitled "Video Disc Player". The servo apparatus described in the application includes a spindle motor for rotating the disc, a tachometer coupled to the motor for producing a signal having a frequency proportional to its angular velocity, and a phase detector for comparing the phase angle of the tachometer signal with that of a periodic reference signal. The output of the phase detector, which is proportional to the phase difference of its two input signals, is suitably amplified and coupled to the motor to rotate the disc at the appropriate constant angular velocity.

An example of another servo apparatus for recovering a video signal from such a disc is described in a co-pending and commonly assigned application for U.S. patent, Ser. No. 920,701, filed in the name of J. S. Winslow et al and entitled System for Recovering Information from a Movable Information Storage Medium. The servo apparatus described in the application is similar to the apparatus described previously, except that substituted for the tachometer signal is a pilot signal, which has been extracted from the signal recovered from the disc. This system operates more effectively to recover the signal from the disc at a prescribed constant rate, however, since it is not as susceptible to errors caused by relative slippage of the disc and eccentricities of the disc.

Since information is recovered from a disc of the type described above by rotating it at a constant angular velocity, and since each information track extends over a full circumference on the disc, a video signal stored in tracks at the periphery of the disc is less densely recorded than a signal stored nearer the center of the disc. The entire information recording capability of the disc is thus not utilized to its fullest extent, and, as a result, the playing time of the disc is substantially lower than it otherwise could be.

One technique for increasing the playing time of an information storage disc is disclosed in a co-pending and commonly assigned application for U.S. patent Ser. No. 961,405, filed simultaneously herewith by the same inventors and entitled System for Recording Information on a Rotatable Storage Disc, In a Substantially Uniform Recording Density. In that application, a technique is described for recording information onto a storage disc of the aforedescribed type, wherein the the disc is rotated relative to a radially movable transducer at an angular velocity that is varied according to the radius of the particular information track in question. In particular, a substantially uniform recording density over the entire disc can be achieved by rotating the disc at an angular velocity inversely proportional to the radius of the selected track. The amount of information recorded on each information track is thus generally proportional to the length of the track. Since known prior apparatus for recovering information from rotatable information storage discs operate to rotate the disc only at a constant angular velocity relative to a transducer, they are generally incapable of recovering information from discs of the type having such a uniform recording density.

It will thus be appreciated that there is a need for a method and apparatus for rotating an information storage disc of the type described above at a variable angular velocity relative to a transducer, to recover information from the disc at a prescribed constant rate. Moreover, there is a particular need or a method and apparatus for recovering information from a disc having a uniform recording density. The present invention fulfills these needs.

SUMMARY OF THE INVENTION

The present invention is embodied in apparatus and a related method for controllably rotating an information storage disc relative to transducer means for recovering information stored thereon. The information is stored in a plurality of substantially circular and concentrically arranged information tracks, and the transducer means is radially movable relative to the disc to recover the information from a selected one of the tracks. The recording density of the stored information is such that, to recover the information at a prescribed constant rate, the disc must be rotated at an angular velocity that varies according to the radius of the selected track.

The apparatus includes means for producing a coarse speed control signal that varies according to the radius of the selected information track, means responsive to the coarse signal for producing a composite speed control signal representative of the prescribed speed at which the disc is to be rotated, and means responsive to the composite speed control signal for rotating the disc, accordingly. In accordance with the invention, the apparatus further includes means for comparing a periodic signal included in the information recovered from the disc with a periodic reference signal, and for producing a corresponding fine speed control signal that is coupled to the means for producing the composite speed control signal, to adjust such composite signal in a prescribed fashion, accordingly. As a result, the angular velocity of the disc is controllably adjusted, such that the information is recovered therefrom by the transducer means at the prescribed constant rate.

More particularly, an apparatus constructed in accordance with the present invention is especially adapted for use in recovering a video signal from an information storage disc having a substantially uniform recording density over its entire information-bearing surface. To properly recover the video signal, the angular velocity of the disc relative to the transducer means must be maintained substantially inversely proportional to the radius of the information track from which information is being recovered by the transducer means.

The coarse speed control means preferably comprises a potentiometer mechanically coupled to the transducer means, which is movable radially relative to the disc. An electrical signal produced by the potentiometer is substantially proportional to such radius and is coupled to the means for producing the composite speed control signal, which, in the preferred embodiment comprises a voltage-controlled oscillator (VCO). The composite speed control signal produced by the VCO has a frequency substantially inversely proportional to the radius of the selected track, and is coupled to a conventional servomechanism for rotating the disc at a corresponding angular velocity. Thus, as a result of the coarse speed control means, alone, the angular velocity of the disc will be controllably adjusted as the transducer means moves from track to track, and, depending on the linearity of the potentiometer and the VCO, the resultant velocity will be within a prescribed tolerance of the precise velocity necessary for recovering the information at the prescribed constant rate.

A fine adjustment of the angular velocity of the disc is accomplished by the fine speed control means, which operates to compare the timing of the video signal recovered from the disc with a periodic reference signal. The fine speed control means preferably includes a phase-locked loop for detecting a pilot signal included in the video signal recovered from the disc and producing a periodic signal having a corresponding frequency, along with a stable reference oscillator for generating the periodic reference signal. The respective periodic signals are suitably frequency divided and compared to each other in a phase detector to produce the fine speed control signal, which has an average voltage proportional to the difference in the phase angles of the respective signals.

The fine speed control signal is transmitted to a summing amplifier, where it is combined with the coarse speed control signal, for coupling to the VCO. As a result, the frequency of the composite speed control signal produced by the VCO will be adjusted automatically, to cause the servo to rotate the disc at an appropriate angular velocity such that the video signal is recovered from the disc at the prescribed constant rate. By way of example, if the coarse speed control means, by itself, operated to rotate the disc at too low an angular velocity, the fine speed control means would detect a relative phase lag in the recovered video signal and would adjust the average voltage level of the fine speed control signal it produces, accordingly. The voltage applied to the VCO would thus be controllably adjusted, whereby the frequency of the composite speed control signal would be increased and the angular velocity of the disc increased, accordingly, until the proper speed were achieved. The apparatus would operate in a similar fashion to decrease the angular velocity of the disc if a phase lead in the recovered video signal were detected.

Other aspects and advantages of the present invention will become apparent from the following description of the preferred embodiment taken in conjunction with the accompanying drawings, which disclose, by way of example, the principles of the invention.

DESCRIPTION OF THE PREFERRED EMBODIMENT

Figure 2:
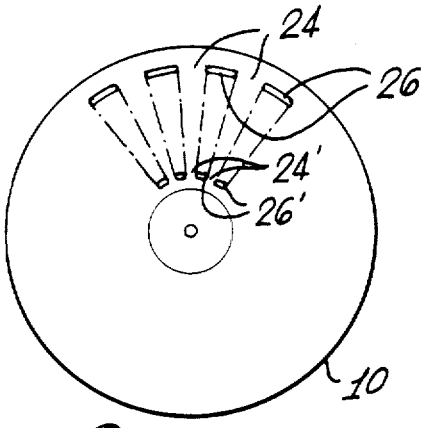
Fig. 2 PRIOR ART
FIG. 2 is a plan view of the video disc of FIG. 1, showing, in enlarged form, the successive light-reflective and light-scattering regions forming the two information tracks.
Figure 1:
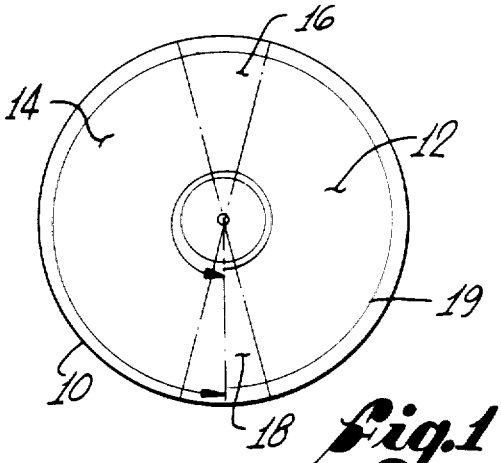
Fig. 1 PRIOR ART
FIG. 1 is a plan view of a prior video disc, showing, in schematic form, two information tracks, each extending over one complete circumference and containing one frame of a video signal.

Referring now to the drawings, and particularly to FIGS. 1 and 2, there is shown a typical prior art record disc 10 for storing information, such as a video signal. As shown in FIG. 1, the signal is recorded in a plurality of substantially circular information tracks forming a spiral pattern on the disc, with each track containing one frame of video information. The even fields for all of the tracks form a sector indicated by the reference numeral 12, while the odd fields form a sector indicated by the numeral 14 and the vertical blanking intervals form sectors indicated at 16 and 18. It will be apparent that an information track located at the periphery of the video disc 10, such as the track indicated by the numeral 19, is of considerably longer length than is an information track located nearer the center of the disc, such as the track indicated by the numeral 20.

FIG. 2 is another schematic view of the disc shown in FIG. 1, wherein indicia of the recorded video signal are shown in enlarged form. The form of this video disc is described in more detail in a co-pending and commonly assigned application for U.S. patent Ser. No. 890,407, filed in the name of John S. Winslow and entitled "Mastering Machine". The video signal is ordinarily stored on the disc 10 in the form of a frequency modulated carrier and it comprises an alternating sequence of light-reflective and light-scattering regions, 24 and 26, respectively. The light-scattering regions 26 normally have a uniform width in the radial direction, and the lengths of adjacent light-scattering and light-reflective regions are essentially equal, because, together, they represent a single cycle of the frequency modulated signal. Since the same amount of information is recorded on each track, i.e., one video frame, the size of the successive light-scattering regions changes as a function of its radial position. This can be observed in FIG. 2 by noting the relative sizes of the light-reflective and light-scattering regions, 24 and 26, respectively, for a track near the periphery of the disc 10, and the light-reflective and light-scattering regions, 24' and 26', respectively, for a track near the center of the disc.

Figure 3:
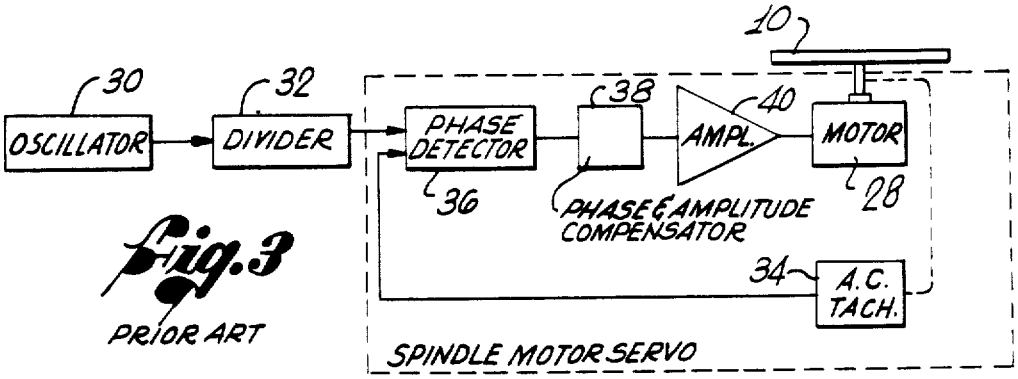
Fig. 3 PRIOR ART
FIG. 3 is a simplified block diagram of a prior art apparatus for rotating the video disc of FIG. 1 at a constant angular velocity, to recover the video signal therefrom.

FIG. 3 is a simplified block diagram of a prior art system utilized in rotating the disc 10 of FIGS. 1 and 2 at a constant angular velocity of 30 revolutions per second. The system includes an oscillator 30 for generating a reference frequency that is frequency divided by a divider circuit 32 to produce a speed reference signal, a spindle motor 28, and an AC tachometer 34 coupled to the spindle motor for producing a signal having a frequency proportional to the actual angular velocity of the disc 10. The system further includes a phase detector circuit 36 for comparing the respective phase angles of the tachometer signal and the speed reference signal and for producing a corresponding control signal. The control signal is, in turn, processed in a lead/lag compensator 38 and an amplifier 40 for coupling to the motor 28 to controllably adjust its angular velocity to properly rotate the disc 10 at 30 revolutions per second.

Figure 4:
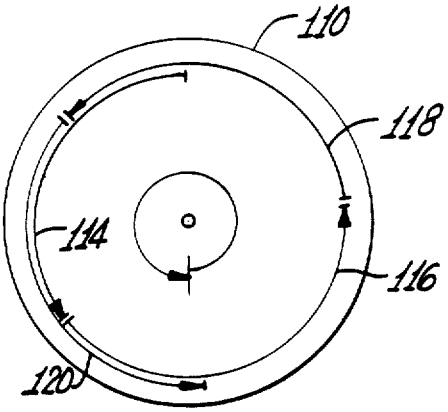
FIG. 4 is a plan view of a video disc for use with apparatus of the present invention, showing, in schematic form, a plurality of frames of a video signal recorded on the disc, each of the frames having substantially the same length.
Figure 5:
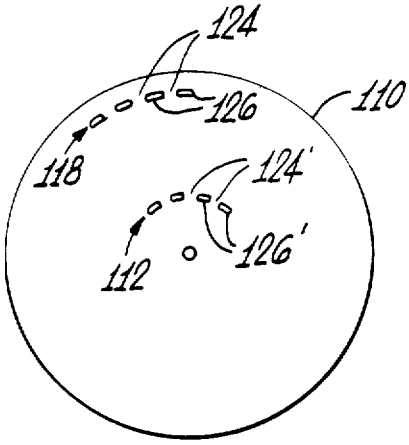
FIG. 5 is a plan view of the video disc of FIG. 4, showing, in enlarged form, the successive light-reflective and light-scattering regions for two information tracks, one located near the periphery of the disc and the other near the center of the disc.

Referring now to FIGS. 4 and 5, there is shown a video disc 110 for use with apparatus of the present invention. FIG. 4 shows, in schematic form, one frame 112 of a video signal, extending over one complete information track near the center of the disc, along with a plurality of consecutive video signal frames 114, 116, 118, and 120 extending over a pair of tracks located near the periphery of the disc, each of these latter frames extending over substantially less than a complete circumference of the disc. The length of each frame on the disc is substantially the same.

FIG. 5 shows, in enlarged form, the successive light-reflective and light-scattering regions 122 and 124 for a portion of the video signal frame designated 118, along with corresponding regions 122' and 124' for a portion of the frame designated 112. It should be noted that, since each video signal frame recorded on the disc is substantially of equal length, the nominal lengths of the respective light-scattering regions 124 and 124' are, likewise, substantially equal.

Figure 6:
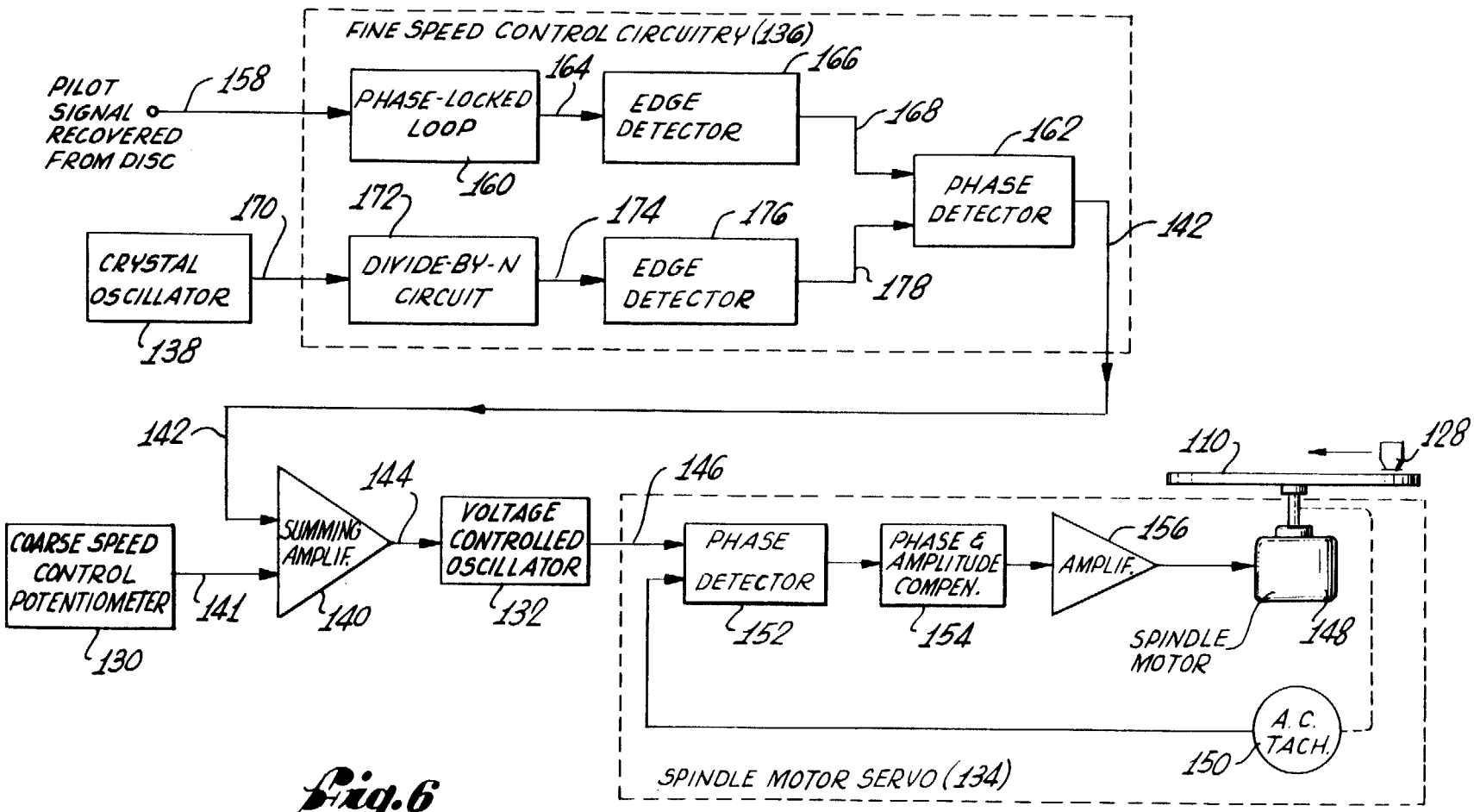
FIG. 6 is a simplified block diagram of apparatus of the present invention for rotating the video disc of FIG. 4 at a precisely controllable angular velocity, such that the video signal is recovered from the disc at a prescribed rate.

Referring now to FIG. 6, there is shown a simplified block diagram of apparatus for controllably rotating the disc 110 of FIGS. 4 and 5 at a variable angular velocity relative to an optical transducer 128, such that the video signal is recovered from the disc at a prescribed constant rate. The optical transducer is movable radially relative to the disc to recover the video signal from a selected one of the information tracks, and the apparatus operates to rotate the disc such that the selected track is moved at a substantially constant linear velocity relative to the transducer. The prescribed constant rate at which the video signal is recovered from the disc corresponds to conventional broadcast format standards, whereby the signal can be properly received and displayed by a conventional television receiver (not shown).

The apparatus includes a coarse speed control potentiometer 130 mechanically coupled to the transducer 128 for producing a coarse speed control signal, which is generally proportional to the radius of the particular information track from which information is being recovered, a voltage-controlled oscillator (VCO) 132, responsive to the coarse speed control signal, for producing a composite speed control signal having a frequency that corresponds thereto, along with a spindle motor servo 134, responsive to the composite speed control signal, for rotating the disc 110 at the corresponding angular velocity. The coarse speed control signal, being generally proportional to the radius of the selected track, thus yields a coarse approximation of the particular angular velocity required for recovery of the video signal at the prescribed constant rate.

In accordance with the invention, the apparatus further includes fine speed control circuitry 136 for comparing the phase angle of a periodic signal included in the information recovered from the disc 110 with that of a periodic reference signal derived from a crystal oscillator 138. The circuitry 136 produces a fine speed control signal for combination with the coarse speed control signal in a summing amplifier 140 and coupling to the VCO 132. The frequency of the composite speed control signal and, in turn, the angular velocity of the disc 110 are thus properly adjusted such that the periodic signal from the disc and the periodic reference signal from the oscillator have synchronous frequencies, and the video signal is therefore recovered from the disc at the prescribed constant rate.

The periodic signal that is recovered from the disc 110 and detected by the fine speed control circuitry 136, preferably comprises a pilot signal, having a predetermined constant frequency, that is additively combined with the video signal. Alternatively, many other periodic signals can be utilized, such as, for example, the successive vertical or horizontal synchronization pulses or the successive chrominance bursts in the video signal, itself.

The coarse speed control potentiometer 130 is mechanically coupled to the optical transducer 128 and is adapted to produce an electrical current signal substantially directly proportional to the radius of the information track from which the transducer is recovering information. This current signal is transmitted over line 140 to the summing amplifier 140, where it is combined with the fine speed control signal supplied over line 142 from the fine speed control circuitry 136 and converted to a composite voltage signal for transmission over line 144 to the VCO 132. The VCO, in turn, produces the composite speed control signal for transmission over line 146 to the spindle motor servo 134, which operates to rotate the information disc 110 at an angular velocity corresponding to the frequency of the composite speed control signal. For reasons that will become apparent subsequently, the potentiometer 130 and the VCO 132 and preferably sufficiently linear that, disregarding the effects of the fine speed control signal, the instantaneous frequency of the composite speed control signal will always be within a tolerance of approximately 5% of the actual frequency necessary for recovery of information from the disc at the prescribed constant rate.

The spindle motor servo 134 includes a spindle motor 148 for rotating the disc 110, an AC tachometer 150 coupled to the spindle motor for producing a tachometer signal having a frequency proportional to its angular velocity, and a phase detector 152 for comparing the phase angle of the tachometer signal with that of the composite speed control signal. The phase detector produces a control signal proportional to the detected phase difference, for processing by a lead/lag compensator 154 and amplification by an amplifier 156 and, in turn, coupling to the spindle motor 148 to control its angular velocity. The servo 134 operates in a conventional manner to synchronize the respective frequencies and phase angles of the composite speed control signal and the tachometer signal, whereby the angular velocity of the spindle motor 148, and, therefore, the disc 110, are made to follow the varying frequency of the composite speed control signal.

The fine speed control circuitry 136 receives on line 158 the pilot signal included with the video signal recovered from the disc 110, and produces the fine speed control signal for use by the apparatus in precisely adjusting the angular velocity of the disc to result in a recovery of the video signal at the proper rate. The circuitry 136 includes a phase-locked loop circuit 160 for detecting the pilot signal, along with a phase detector 162 for comparing the phase angle of the detected signal with that of the periodic reference signal derived from the crystal oscillator 138.

The phase-locked loop 160 operates in a conventional manner to detect the successive cycles of the pilot signal supplied on line 158 and to produce a periodic signal having the same frequency. Use of a phase-locked loop insures that, under ordinary circumstances, spurious pulses or signal dropouts will be eliminated and a substantially noise-free periodic signal will be produced. The "pull-in range" of the phase-locked loop must exceed the maximum range of frequencies over which the frequency of the recovered pilot signal is expected to vary. Since, as previously mentioned, the tolerance on the linearity of the coarse speed control potentiometer 130 and the VCO 132 is 5%, it follows that the pull-in range of the phase-locked loop must exceed 5% of the nominal pilot signal frequency. The periodic signal produced by the phase-locked loop 160 is transmitted over line 164 to a conventional edge detector 166, which produces a short duration pulse for each transition of a particular polarity, for transmission over line 168 to a first input terminal of the phase detector 162.

The crystal oscillator 138 produces a periodic clock signal for transmission over line 170 to a divide-by-N circuit 172, where it is frequency divided to produce the periodic reference signal having the same frequency as the nominal frequency of the periodic signal produced by the phase-locked loop circuit 160. This periodic reference signal from the divide-by-N circuit is transmitted over line 174 to a conventional edge detector 176, which produces a short duration pulse for each transition of a particular polarity, for transmission over line 178 to a second input terminal of the phase detector 162.

The phase detector 162 compares the respective phase angles of the two input pulse sequences it receives from the two edge detectors 166 and 176, and produces the fine speed control signal, which has an average voltage proportional to the phase difference. The fine speed control signal is transmitted over line 142 to the summing amplifier 140, where it is combined with the coarse speed control signal for transmission to the VCO 132. When a phase lead in the pilot signal is detected by the phase detector, indicating that the video signal is being recovered from the disc 110 at a rate too high, the average voltage of the fine speed control signal will automatically increase in value, thereby causing a corresponding decrease in the frequency of the composite speed control signal produced by the VCO, and a corresponding decrease in the angular velocity of the disc, to correct for the phase lead. Conversely, when a phase lag in the pilot signal is detected, indicating that the video signal is being recovered at a rate too low, the average voltage of fine speed control signal will automatically decrease in value, thereby causing the angular velocity of the disc to be increased, accordingly, to correct for the phase lag.

The phase detector 162 preferably comprises a bidirectional counter in the form of a 3-stage shift register in which the input from one edge detector 166 or 176 is applied to the left stage, the input from the other edge detector is applied to the right stage, and the output (i.e., the fine speed control signal) is produced by the center stage. During normal operation, a pulse received on one input will cause a positive-going transition in the output signal, and a pulse received on the other input will cause a negative-going transition in the output signal. Thus, if the pulses in the two input signals are received in an alternating fashion, indicating that they have the same frequency, the output will comprise a pulse sequence whose average voltage is proportional to the phase difference of the two inputs. This bidirectional counter is described in more detail in an article written by R. A. Millar, entitled "Digital Control of Shaft Speed and Position", published in IEEE Spectrum, January, 1968.

From the foregoing description, it should be apparent that the present invention provides an effective apparatus and related method for recovering information from an information storage disc having a plurality of substantially concentrically arranged information tracks, with the information being recorded on the tracks at a substantially uniform recording density. The apparatus includes both coarse and fine speed control circuitry for effecting a precise control of the angular velocity of the disc, such that the information is recovered from the disc at a prescribed constant rate.

Although the invention has been described in detail with reference to its presently preferred embodiment, it will be understood by one of ordinary skill in the art that various modifications can be made without departing from the spirit and scope of the invention. Accordingly, it is not intended that the invention be limited, except as by the appended claims.

We claim:

1. Apparatus for recovering a video signal from a rotatable information storage disc, wherein the video signal is stored on the disc in a plurality of substantially circular and concentrically arranged information tracks, each track having a substantially uniform recording density, said video signal being recovered from the disc at a substantially constant rate by a transducer that is movable radially relative to the disc to be in a prescribed relationship with a selected information track, said apparatus comprising:

a potentiometer coupled to the transducer for producing a coarse speed control signal that varies substantially linearly with the radius of the selected information track from which the video signal is being recovered by the transducer;

oscillator means for producing a periodic reference signal having a prescribed constant frequency that corresponds to the rate at which the video signal is to be recovered from the disc;

fine speed control means for comparing the phase angle of a periodic pilot signal included with the video signal recovered from the disc, with the phase angle of the periodic reference signal, and for producing a fine speed control signal having an average value that corresponds to the difference in the respective phase angles, said fine speed control means including a phase-locked loop for detecting the periodic pilot signal;

means for summing together the coarse speed control signal and the fine speed control signal, to produce a composite voltage signal;

voltage-controlled oscillator means for producing a composite speed control signal having a frequency that corresponds to the composite voltage signal; and means for rotating the disc at an angular velocity corresponding to the frequency of the composite speed control signal;

said [coarse speed control means] *potentiometer* and said voltage-controlled oscillator means being constructed with sufficient linearity that the composite speed control signal will always have a frequency that causes the disc to be rotated at an angular velocity that results in the recovered pilot signal having a frequency within the pull-in range of said phase-locked loop, whereby said fine speed control means is always operable to produce the fine speed control signal for effecting a fine adjustment of the angular velocity of the disc, and whereby the video signal is recovered from the disc substantially at the prescribed constant rate.

2. Apparatus for recovering a video signal from a rotatable information storage disc, wherein the video signal is stored on the disc in a plurality of substantially circular and concentrically arranged information tracks, each track having a substantially uniform recording density, said video signal being recovered from the disc at a substantially constant rate by a transducer that is movable radially relative to the disc to be in a prescribed relationship with a selected information track, said apparatus comprising:

a potentiometer coupled to the transducer for producing a coarse speed control signal substantially proportional to the radius of the selected information track from which the video signal is being recovered by the transducer;

oscillator means for producing a periodic reference signal having a prescribed constant frequency that corresponds to the rate at which the video signal is to be recovered from the disc;

fine speed control means for comparing the phase angle of a periodic pilot signal recovered from the disc along with the video signal, with the phase angle of the periodic reference signal, and for producing a fine speed control signal having an average value that corresponds to the difference in the respective phase angles, said fine speed control means including a phase-locked loop for detecting the relative phase angle of the periodic pilot signal;

means for summing together the coarse speed control signal and the fine speed control signal, to produce a composite voltage signal;

voltage-controlled oscillator means for producing a composite speed control signal having a frequency that corresponds to the composite voltage signal; and means for rotating the disc at an angular velocity corresponding to the frequency of the composite speed control signal;

said [coarse speed control means] *potentiometer* and said voltage-controlled oscillator means being constructed with sufficient linearity that the composite speed control signal will always have a frequency that causes the disc to be rotated at an angular velocity that results in the recovered pilot signal having a frequency within the pull-in range of said phase-locked loop, whereby said fine speed control means is always operable to produce the fine speed control signal for effecting a fine adjustment of the angular velocity of the disc, and whereby the video signal is recovered from the disc substantially at the prescribed constant rate.

3. Apparatus for recovering a video signal from a rotatable information storage disc, wherein the video signal is stored on the disc in a plurality of substantially circular and concentrically arranged information tracks, each track having a substantially uniform recording density, said video signal being recovered from the disc at a substantially constant rate by a transducer that is movable radially relative to the disc to be in a prescribed relationship with a selected information track, said apparatus comprising:

coarse speed control means for producing a coarse speed control signal that varies substantially linearly with the radius of the selected information track from which the video signal is being recovered by the transducer;

oscillator means for producing a periodic reference signal having a prescribed constant frequency that corresponds to the rate at which the video signal is to be recovered from the disc;

fine speed control means for comparing the phase angle of a periodic signal included in the video signal recovered from the disc with the phase angle of the periodic reference signal, and for producing a fine speed control signal having an average value that corresponds to the difference in the respective phase angles;

means for summing together the coarse speed control signal and the fine speed control signal, to produce a composite voltage signal;

voltage-controlled oscillator means for producing a composite speed control signal having a frequency that corresponds to the composite voltage signal; and means for rotating the disc at an angular velocity corresponding to the frequency of the composite speed control signal, whereby the video signal is recovered from the disc substantially at the prescribed constant rate,

*wherein said fine speed control means includes a phase-locked loop for detecting the periodic signal recovered from the disc; and*

*wherein said coarse speed control means and said voltage-controlled oscillator means are constructed with sufficient linearity that the composite speed control signal will always have a frequency that causes the disc to be rotated at an angular velocity that results in the horizontal synchronization pulses in the periodic signal recovered from the disc having a frequency within the pull-in range of said phase-locked loop, whereby said fine speed control means is always operable to produce the fine speed control signal for effecting a fine adjustment of the angular velocity of the disc.*

4. Apparatus as defined in claim 3, wherein said coarse speed control means [included] *includes* a potentiometer coupled to the radially movable transducer.

5. Apparatus as defined in claim 3, wherein the transducer is moved radially relative to the disc in a continuous fashion, and the video signal is recovered from the successive information tracks, seriatum.

[6. Apparatus as defined in claim 3, wherein said fine speed control means includes a phase-locked loop for detecting the relative phase angle of the periodic signal recovered from the disc.]

[7. Apparatus as defined in claim 6, wherein said coarse speed control means and said voltage-controlled oscillator means are constructed with sufficient linearity that the composite speed control signal will always have a frequency that causes the disc to be rotated at an angular velocity that results in the horizontal synchronization pulses in the periodic signal recovered from the disc having a frequency within the pull-in range of said phase-locked loop, whereby said fine speed control means is always operable to produce the fine speed control signal for effecting a fine adjustment of the angular velocity of the disc.]

8. Apparatus as defined in claim [7] 5, wherein the periodic signal in the video signal recovered from the disc is a pilot signal that is summed with the video signal, said pilot signal having a predetermined constant frequency.

9. A method for controllably rotating an information storage disc relative to a transducer, to recover information that is stored on the disc in a plurality of substantially circular and concentrically arranged information tracks, wherein the information is recovered from the disc at a substantially constant rate, said method comprising the steps of:

determining the radius of the particular information track from which information is being recovered by the transducer, and producing a coarse speed control signal in accordance therewith;

producing a periodic reference signal having a predetermined constant frequency;

comparing a periodic signal included in the information recovered from the disc with the periodic reference signal, to produce a fine speed control signal representative of the comparison;

producing a composite speed control signal in accordance with the coarse speed control signal and the fine speed control signal, said composite signal being representative of the prescribed angular velocity at which the disc is to be rotated; and rotating the disc at the prescribed angular velocity, in accordance with the composite speed control signal, whereby the information is recovered by the transducer at the prescribed constant rate,

*wherein said step of comparing includes the step of detecting the periodic signal recovered from the disc in a phase-locked loop; and*

*wherein said steps of producing the coarse speed control signal and producing the composite speed control signal are performed with sufficient precision that the resulting composite speed control signal will cause the disc to be rotated at an angular velocity that results in the periodic signal in the recovered information having a frequency within the pull-in range of the phase-locked loop, whereby said step of comparing and producing the fine speed control signal will always effect a fine adjustment of the angular velocity of the disc.*

10. A method as defined in claim 9, wherein the coarse speed control signal is substantially directly proportional to the radius of the information track from which information is being recovered.

11. A method as defined in claim 9, wherein:

said step of producing the composite speed control signal includes the steps of summing together the coarse speed control signal and the fine speed control signal, to produce a composite voltage signal, and producing the composite speed control signal in a voltage-controlled oscillator, said composite speed control signal having a frequency substantially inversely proportional to the voltage of the composite voltage signal; and the disc is rotated in said step of rotating at an angular velocity substantially directly proportional to the frequency of said composite speed control signal.

12. A method as defined in claim 9, wherein the composite speed control signal is substantially inversely proportional to the radius of the selected information track from which information is being recovered, whereby the information storage disc is controllably rotated at an angular velocity substantially inversely proportional to the radius of the selected track and the disc is moved relative to the transducer at a substantially constant linear velocity.

13. A method as defined in claim 9, wherein:

said step of comparing includes the step of comparing the phase angle of the periodic signal recovered from the disc with the phase angle of the periodic reference signal; and said fine speed control signal has an average value representative of the difference in the relative phase angles of the two periodic signals.

14. A method as defined in claim 13, wherein:

the periodic signal recovered from the disc is a separate periodic pilot signal that is summed with a video signal, said pilot signal having a predetermined constant frequency.

[15. A method as defined in claim 13, wherein said step of comparing includes the step of detecting the periodic signal recovered from the disc in a phase-locked loop.]

[16. A method as defined in claim 15, wherein said steps of producing the coarse speed control signal and producing the composite speed control signal are performed with sufficient precision that the resulting composite speed control signal will cause the disc to be rotated at an angular velocity that results in the periodic signal in the recovered information having a frequency within the pull-in range of the phase-locked loop, whereby said step of comparing and producing the fine speed control signal will always effect a fine adjustment of the angular velocity of the disc.]

17. Apparatus for controllably rotating an information storage disc relative to a transducer, to recover information that is stored on the disc in a plurality of substantially circular and concentrically arranged information tracks, said apparatus operating to recover the information at a substantially constant rate, said apparatus comprising:

*coarse speed control* means for producing a coarse speed control signal that varies according to the radius of the particular information track from which the information is being recovered;

means for producing a periodic reference signal having a predetermined constant frequency;

fine speed control means for comparing a periodic signal included in the information recovered from the disc with the periodic reference signal, and for producing a corresponding fine speed control signal representative of the comparison;

means, responsive to the coarse speed control signal and the fine speed control signal, for producing a composite speed control signal representative of the prescribed angular velocity at which the disc is to be rotated; and means, responsive to the composite speed control signal, for rotating the disc at the prescribed angular velocity, whereby the information stored thereon is recovered by the transducer at the prescribed constant rate.

*wherein the fine speed control means includes phase detector means for comparing the relative phase angles of the periodic signal recovered from the disc and the periodic reference signal;*

*said fine speed control signal has an average value representative of the difference in the relative phase angles of the two periodic signals;*

*said fine speed control means includes a phase-locked loop for detecting the periodic signal recovered from the disc; and*

*said coarse speed control means and said means for producing the composite speed control signal are constructed with sufficient precision that the composite speed control signal produced thereby will cause the disc to be rotated at an angular velocity that results in the periodic signal in the recovered information having a frequency with the pull-in range of said phase-locked loop, whereby said fine speed control means is always operable to produce the fine speed control signal for effecting a fine adjustment of the angular velocity of the disc.*

18. Apparatus as defined in claim 17, wherein:

said means for producing a composite speed control signal includes means for summing together the coarse speed control signal and the fine speed control signal, to produce a composite voltage signal, and voltage-controlled oscillator means, responsive to the composite voltage signal, for producing the composite speed control signal, said composite speed control signal having a frequency substantially inversely proportional to the composite voltage signal; and said means for rotating the disc is responsive to the frequency of the composite speed control signal.

19. Apparatus as defined in claim 17, wherein the coarse speed control signal is substantially directly proportional to the radius of the information track from which information is being recovered.

20. Apparatus as defined in claim 19, wherein:

said transducer is movable radially relative to the disc, to be positioned in a prescribed relationship relative to the information track from which information is being recovered; and said coarse speed control means includes a potentiometer that is coupled to said transducer and that is adapted to produce the coarse speed control signal.

21. Apparatus as defined in claim 17, wherein the composite speed control signal is substantially inversely proportional to the radius of the selected information track from which information is being recovered, whereby the apparatus operates to controllably rotate the storage disc at an angular velocity substantially inversely proportional to the radius of the selected track and the disc is moved relative to the transducer at a substantially constant linear velocity.

22. Apparatus as defined in claim 21, wherein:

said transducer is movable radially relative to the disc, to be positioned in a prescribed relationship relative to the selected information track; and said coarse speed control means includes a potentiometer coupled to said transducer and adapted to produce the coarse speed control signal.

[23. Apparatus as defined in claim 17, wherein:

said fine speed control means includes phase detector means for comparing the relative phase angles of the periodic signal recovered from the disc and the periodic reference signal; and said fine speed control signal has an average value representative of the difference in the relative phase angles of the two periodic signals.]

24. Apparatus as defined in claim [23] *17*, wherein:

the periodic signal recovered from the disc is a separate pilot signal having a predetermined constant frequency.

[25. Apparatus as defined in claim 23, wherein said fine speed control means includes a phase-locked loop for detecting the periodic signal recovered from the disc.]

[26. Apparatus as defined in claim 25, wherein said coarse speed control means and said means for producing the composite speed control signal are constructed with sufficient precision that the composite speed control signal produced thereby will cause the disc to be rotated at an angular velocity that results in the periodic signal in the recovered information having a frequency within the pull-in range of said phase-locked loop, whereby said fine speed control means is always operable to produce the fine speed control signal for effecting a fine adjustment of the angular velocity of the disc.]

* * * * *